United States Patent
Fuchs et al.

(10) Patent No.: US 8,089,230 B2
(45) Date of Patent: Jan. 3, 2012

(54) METHOD FOR LIMITING THE EXCESS FORCE OF A CLOSING PART WHICH IS ACTUATED BY AN EXTERNAL FORCE

(75) Inventors: Gerhard Fuchs, St. Andrä-Wördern (AT); Stefan Holzmann, Gaweinstal (AT); Roman Morawek, Vienna (AT)

(73) Assignee: Continental Automotive GmbH, Hannover (DE)

(*) Notice: Subject to any disclaimer, the term of this patent is extended or adjusted under 35 U.S.C. 154(b) by 811 days.

(21) Appl. No.: 12/279,125

(22) PCT Filed: Jan. 30, 2007

(86) PCT No.: PCT/EP2007/050863
§ 371 (c)(1),
(2), (4) Date: Aug. 12, 2008

(87) PCT Pub. No.: WO2007/093496
PCT Pub. Date: Aug. 23, 2007

(65) Prior Publication Data
US 2009/0019772 A1 Jan. 22, 2009

(30) Foreign Application Priority Data
Feb. 14, 2006 (DE) .................. 10 2006 006 821

(51) Int. Cl.
*H02P 7/00* (2006.01)
(52) U.S. Cl. ........ 318/286; 318/432; 318/433; 318/282; 318/266; 318/280; 701/36; 701/49
(58) Field of Classification Search ............... 318/286, 318/432, 433, 282; 701/36, 49
See application file for complete search history.

(56) References Cited

U.S. PATENT DOCUMENTS

| | | | | |
|---|---|---|---|---|
| 5,734,245 A * | 3/1998 | Terashima et al. | ........... | 318/453 |
| 5,977,732 A * | 11/1999 | Matsumoto | .................. | 318/283 |
| 5,994,858 A * | 11/1999 | Miura | ............................ | 318/283 |
| 6,404,158 B1 * | 6/2002 | Boisvert et al. | ............... | 318/469 |
| 6,426,604 B1 * | 7/2002 | Ito et al. | ........................ | 318/466 |
| 6,548,979 B2 * | 4/2003 | Boisvert et al. | ............... | 318/469 |
| 6,573,677 B2 * | 6/2003 | Gerbetz | ......................... | 318/445 |
| 6,667,590 B2 * | 12/2003 | Nagaoka | ........................ | 318/286 |
| 6,840,113 B2 * | 1/2005 | Fukumura et al. | .............. | 73/760 |
| 6,870,339 B2 * | 3/2005 | Kessler et al. | ................. | 318/468 |
| 7,295,894 B2 | 11/2007 | Anderson et al. | ............. | 700/275 |
| 7,305,290 B2 * | 12/2007 | Russ et al. | ......................... | 701/36 |
| 7,548,037 B2 * | 6/2009 | Boisvert et al. | ............... | 318/466 |
| 7,579,802 B2 * | 8/2009 | Boisvert et al. | ............... | 318/466 |
| 2004/0183493 A1 | 9/2004 | Boisvert et al. | ............... | 318/469 |

FOREIGN PATENT DOCUMENTS

| | | |
|---|---|---|
| DE | 196 33 941 A1 | 2/1998 |
| DE | 103 25 888 A1 | 12/2001 |
| EP | 1 487 078 A2 | 4/2004 |

* cited by examiner

*Primary Examiner* — Rita Leykin
(74) *Attorney, Agent, or Firm* — King & Spalding L.L.P.

(57) ABSTRACT

In a method for limiting the excess force of a closing part of an adjusting device, the closing part is actuated by external force. An anti-jamming system determines, during an adjusting operation, current adjusting force values at least within a partial area of the adjusting path and respectively, in predetermined positions of the closing part, and compares the values to adjusting force comparative values which are already stored in a storage device. At least one of the stored adjusting force comparative values are adapted to mechanical technical conditions of the adjusting device and the extent of the adaptation is predetermined according to the service life.

20 Claims, 3 Drawing Sheets

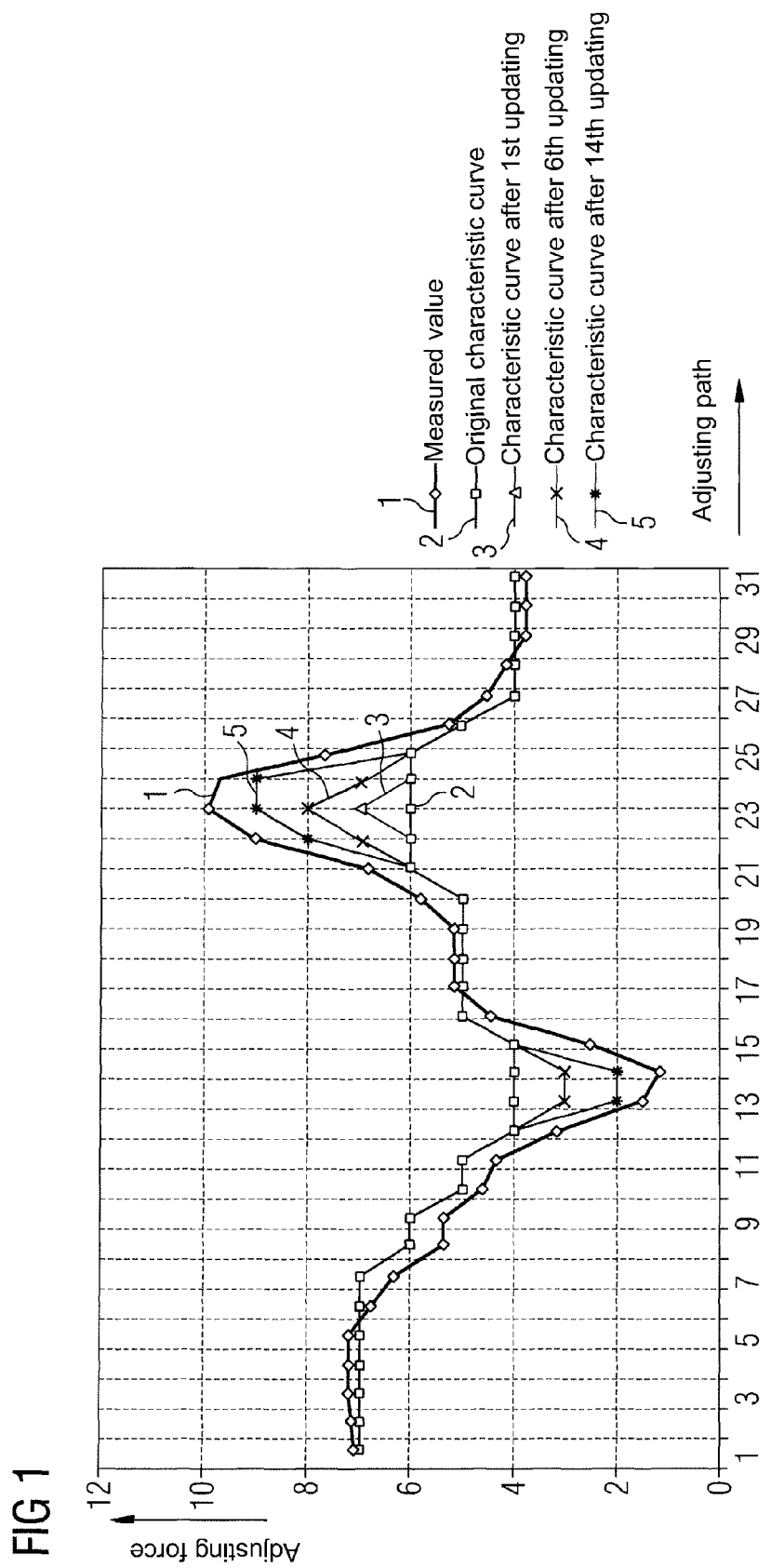

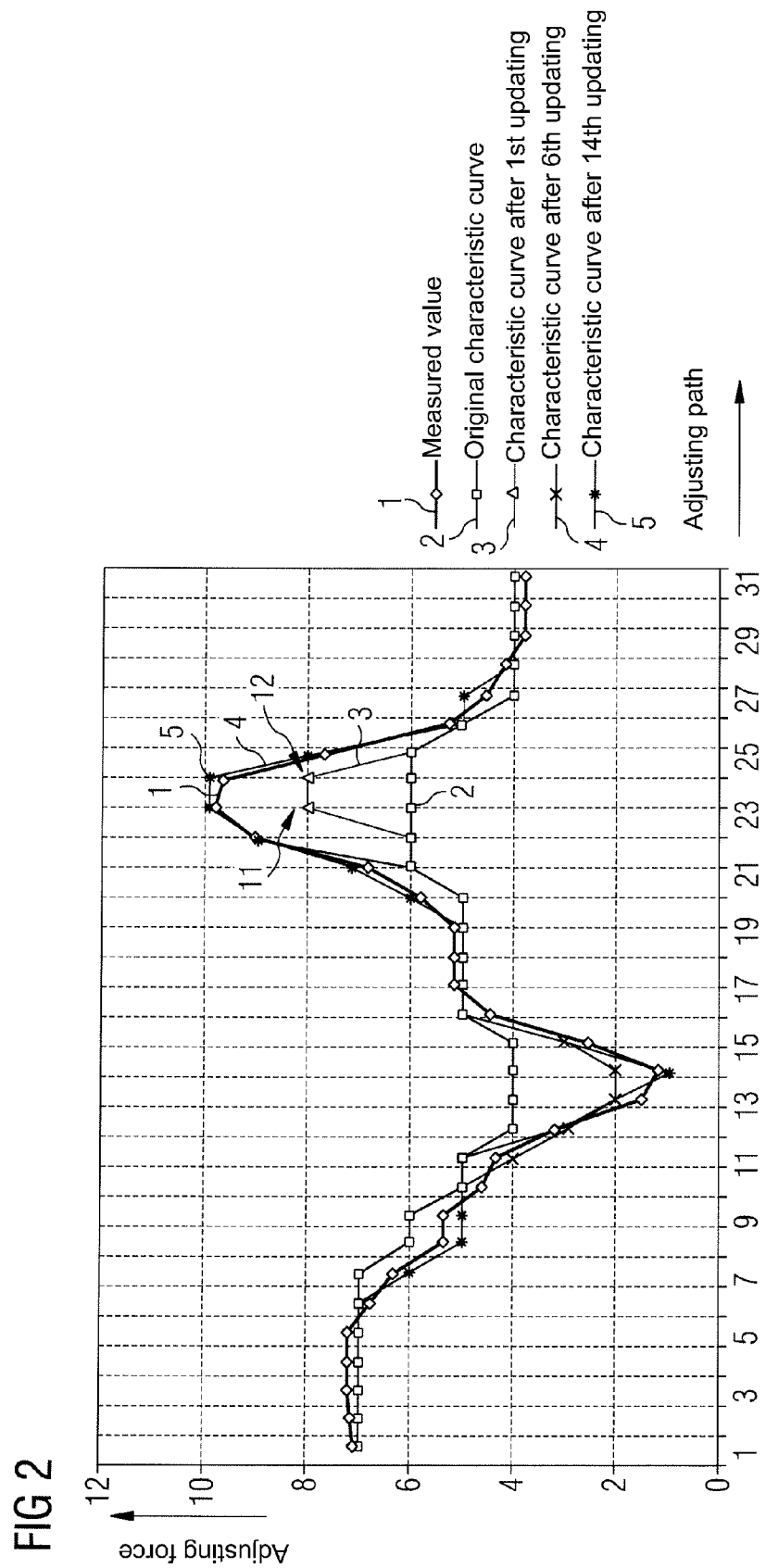

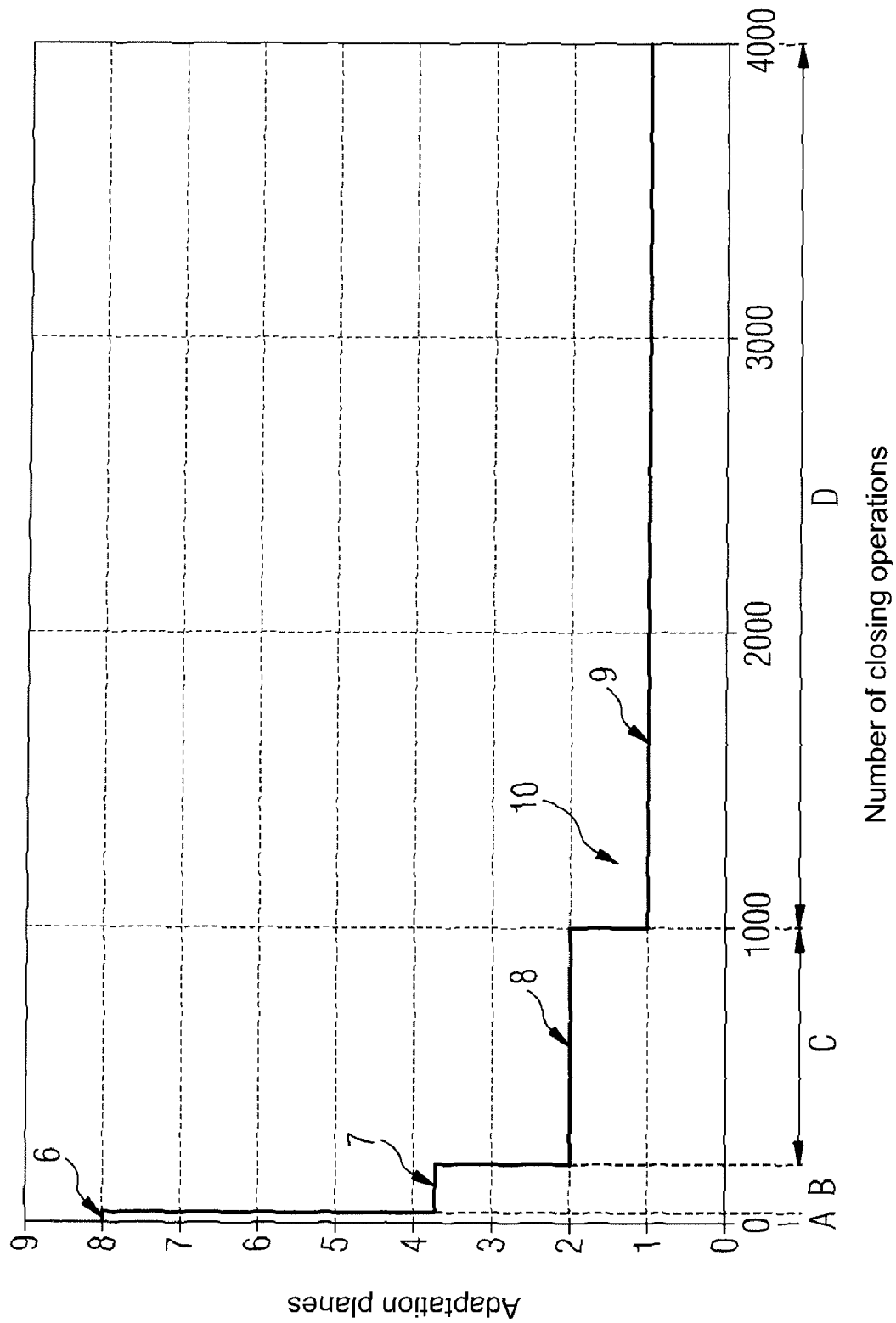

METHOD FOR LIMITING THE EXCESS FORCE OF A CLOSING PART WHICH IS ACTUATED BY AN EXTERNAL FORCE

CROSS-REFERENCE TO RELATED APPLICATIONS

This application is a U.S. national stage application of International Application No. PCT/EP2007/050863 filed Jan. 30, 2007, which designates the United States of America, and claims priority to German application number 10 2006 006 821.1 filed Feb. 14, 2006, the contents of which are hereby incorporated by reference in their entirety.

TECHNICAL FIELD

The invention relates to a method for limiting the excess force of a closing part of an adjusting device, said closing part being actuated by external force, wherein an anti-jamming system determines, during an adjusting operation, current adjusting force values at least within a partial area of the adjusting path, in predetermined positions of the closing part respectively, and compares said values to adjusting force comparative values.

BACKGROUND

With adjusting devices, such as are used for electrically-operated window lifters or sliding roofs in motor vehicles, an anti-jamming system for limiting the excess force generated by the drive is described. The anti-jamming system detects the occurrence of jamming in that it compares the current determined adjusting force values at a predetermined position during an adjusting operation with a predetermined reference. If jamming is present, the movement of the closing part is stopped and, if necessary, the drive is reversed. The reference is formed by adjusting force comparison values, which are normally determined for each adjusting device by an initialization run at the end of production and stored in the form of a learning curve in a memory of the control device.

However, this learning curve is a weak point: the adjusting force comparison values on which the learning curve is based are no longer current soon after its initial use because the mechanical conditions of the adjusting device, especially friction forces and initial sluggishness, can change very rapidly at the start of the utilization phase. These changes are not detected during the initialization run. The consequences of this are that the anti-jamming system does not function at its best, especially at the start of utilization; if jamming occurs, a jamming force is effective which is greater or smaller than would have been necessary with a precise knowledge of the actual opposing mechanical forces. This is unsatisfactory with regard to the safety or stability of the adjusting device.

Furthermore, the recording of a learning curve, which has to be performed individually for each adjusting device, is associated with corresponding costs during manufacture.

In DE 196 33 941 A1, a motor vehicle servoactuator is proposed with which the adjusting device adapts to the changed condition of the mechanical system. For this purpose, a friction force-travel diagram, stored as a reference, is continuously updated during operation.

During updating, the problem arises that the rapidly changing condition of the mechanical system at the start of the service life has to be catered for. In other words, the speed of adaptation must be large. On the other hand, during later operation it is desirable in the event of a disturbance occurring only once, for example when the vehicle is driving on a poorly-paved road, for the adjusting force comparison data to be only slightly influenced. However, a low speed of adaptation is desirable for this purpose.

SUMMARY

A method for limiting the excess force can be provided, with which the smallest possible clamping force is exerted if jamming occurs and which can be realized at low cost.

According to an embodiment, a method for limiting the excess force of a closing part of an adjusting device may comprise the steps of: determining by an anti-jamming system, during an adjusting operation, current adjusting force values at least within a partial area of the adjusting path in predetermined positions of the closing part, respectively, and comparing said values to adjusting force comparative values which are held ready in a storage device, wherein at least one of said stored adjusting force comparative values is adapted to mechanical conditions of the adjusting device and the extent of said adaption is predetermined according to the service life.

According to a further embodiment, the extent of the adaptation may reduce with the increase in service life. According to a further embodiment, the reduction in the extent of the adaptation may take place in stages over the service life. According to a further embodiment, a part interval of the service life may be assigned to each stage, with a number of closing operations being assigned to each of these part intervals. According to a further embodiment, the part intervals may have a different width. According to a further embodiment, the number of closing operations assigned to each part interval may increase with increasing service life.

According to a further embodiment, the extent of the adaptation may be greatest in a first part interval immediately following the initial operation. According to a further embodiment, during a first adjusting operation, which is assigned to the first part interval, several adjusting force comparison values may be changed during the adaptation. According to a further embodiment, during an adjusting operation, which is assigned to the first part interval, an adjusting force comparison value may be changed by several quantization units during the adaptation. According to a further embodiment, during an adjusting operation a number of assigned adjusting force comparison values can be changed by several quantization units. According to a further embodiment, during an initial operation adjusting force comparison values, which were not previously determined by an initialization run of this adjusting device, may be held ready in the storage device.

BRIEF DESCRIPTION OF THE DRAWINGS

For a further explanation of the invention, in the following part of the description reference is made to the drawings, which show further advantageous embodiments, details and developments of the invention. The drawings are as follows:

FIG. 1 A conventional scenario of approximation;

FIG. 2 A scenario of approximation according to an embodiment;

FIG. 3 A diagram showing the relationship of the extent of adaptation to the service life according to various embodiments.

DETAILED DESCRIPTION

In a basic concept, the various embodiments are based on the adaptation of the adjusting force comparative values to the current condition of the mechanical system. In this way, the contradictory requirements mentioned in the introduction can be met, i.e. a fast adaptation immediately after manufacture of the adjusting device and a slow adaptation with increasing service life. In other words, a great advantage of the various embodiments is that the extent of the adaptation can be varied according to the prevailing requirements in each phase of the device. The adjusting force comparative values used by the anti-jamming system thus precisely reflect the mechanical reality. Consequently, the jamming force in the event of jamming is lower. The quality of the anti-jamming system is therefore better.

In a preferred embodiment of the method, it can be provided that the extent of the adaptation, i.e. the updating of the adjusting force comparative values, reduces in line with increasing service life. This means that the speed of progress and intensity of the adaptation process at the beginning of the service life is high. This is desirable because during the run-in period the opposing force to be overcome by the drive fluctuates considerably. As a result, the adjusting force comparative values stored in the memory already correspond to the current condition of the mechanical system after a few closing cycles. The result is a decisive advantage of the various embodiments in that the recording of a learning curve can be completely omitted during the manufacture of the adjusting device. This reduces the production costs. An electrical window lifter or sliding roof can be delivered to the motor vehicle manufacturer with type-specific reference data. The expensive determination of individual reference data is no longer necessary. The system adapts itself during customer use after installation in the motor vehicle. The comparatively inaccurate reference data is overwritten by current adjusting force comparative values after a few adjusting cycles are carried out by the manufacturer of the motor vehicle and the system is adapted to the condition of the mechanical system. On the other hand, only slight changes are permitted after completion of the run-in phase. Because of this, unique external events, such as driving over a poorly paved section of road or a drain, cause hardly any distortion of the adjusting force comparative values. They reflect the mechanical reality very well even after a long service life. The anti-jamming system is very robust.

In a particularly preferred embodiment, it can be provided that the speed of approximation is carried out in steps. In this way, according to an embodiment, the method can be realized with a low computing cost, i.e. the algorithm requires only a little program code and little computing power.

For this purpose, it is useful if a part interval of the service life is assigned to each stage and a number of closing operations is assigned to each of these part intervals.

A good adaptation to the condition of the mechanical adjusting device due to the degree of utilization can be achieved in that the service life of the adjusting device is divided into part intervals of different widths. This means that the algorithm can be differentiated according to the particular prevailing conditions.

In particular, it can be favorable if the number of closing operations assigned to each part interval increases with increasing service life.

For a good adaptation during the run-in phase, it can be favorable if the adaptation is carried out with greater intensity in a first part interval immediately following the initial operations.

For a high adaptation speed, it can be favorable if during an adjusting operation which is assigned to the first part interval, several adjusting force comparative values are adapted at the same time during the adaptation. In this case it is particularly advantageous if these adjusting force comparative values are increased or reduced by several quantization units.

With respect to low manufacturing costs, it is particularly advantageous if during the initial operation reference values are used that are representative of a class of adjusting devices, e.g. for window lifters. This means that the expensive and complicated recording of the learning curve, which moreover can also be prone to errors, can be omitted.

FIG. 1 is a scenario of the approximation of an adjusting force characteristic curve to a previously-measured target characteristic curve according to prior art. The illustration is an example of a microprocessor-controlled adjusting device, such as is typically used in motor vehicles. For safety reasons, an anti-jamming system, which continuously compares current determined adjusting force values with corresponding adjusting force corresponding values during a closing operation, acts to limit the excess force. The excess force in this case is the difference between the adjusting force provided by the motor less the current adjusting force required to overcome the friction forces in the mechanical system. The greater the excess force, the faster the actuation of the closing part but also the greater the jamming force acting in the event of a jam. For safety reasons, this jamming force, as already mentioned in the introduction, is to be kept low. The risk of having to treat an injury is then minimized. The current adjusting force values are determined by measurement. This can, for example, take place by measuring the motor current. The current adjusting force values can also be indirectly determined, for example by a computation operation in a microprocessor which receives pulses from an incremental transmitter coupled to the motor shaft.

The determined adjusting force values are assigned to a position in the adjusting path in each case. Each adjusting force value is digitized, i.e. it consists of a specific number of quantization units. The entirety of the determined current adjusting force values forms a characteristic curve seen over the adjusting path.

Algorithms known up to now for recording a representative learning curve work in such a way that the updating of the reference data is active only if no jamming operation was detected during ambient conditions representative of a closing operation (temperature of the room, stationery vehicle, normal operating voltage) and a relevant deviation between the expected adjusting force and an observed adjusting force is present. Only in this case does an updating of the reference data take place. The updating takes place at precisely the point at which the greatest deviation occurs. In practice this means that a quantization unit (of value 1) is added or subtracted at this characteristic curve point if the observed force is higher or lower than the expected force.

In FIG. 1 reference character 1 shows a characteristic curve formed from individual measured values that correspond in each case to current determined adjusting force values. Reference character 2 shows an original characteristic curve that can, for example, be a learning curve that will be determined during the initialization run of the adjusting device mentioned in the introduction. As already stated, with a jam detection system according to the prior art the updating takes place in that an algorithm of the control device adds or subtracts a quantizing unit depending on whether the adjusting force is greater or less than a expected adjusting force, at a specific point in the characteristic curve. This approximation is illustrated in FIG. 1, which shows that based on the original characteristic curve 2 a quantization unit was added to a value at which the deviation between the current and stored adjusting force values is greatest (from 6 to 7 according to the scale of FIG. 1). The result after this first updating is therefore a characteristic curve of adjusting force comparative values shown by the reference character 3 in FIG. 1. After six adjusting operations a characteristic curve, shown by reference character 4, is obtained. As can be easily seen from FIG. 1, there is also after several adjusting operations (characteristic curve with reference character 5 after the fourteenth updating) a substantial deviation between the current measured adjusting force values (characteristic curve 1) and the approximation characteristic curve 5 after the fourteenth closing operation. The approximation speed at which the characteristic curve 2 approaches the measured value characteristic curve 1 is therefore slow.

Compared to this, FIG. 2 shows the approximation according to an embodiment. The same reference characters in each case identify characteristic curves after an equal number of updating operations. The following description is again based on the starting characteristic curve 2. After to the first adjusting operation, a characteristic curve is produced, which is shown by reference character 3 in FIG. 2. Arrows 11 and 12 indicate two updated adjusting force comparison values whose values were incremented by 2 (from 6 to 8 in FIG. 2). After the sixth updating, the characteristic curve 4 is already very close to its target. After the fourteenth adjusting operation the characteristic curve shown by reference character 5 has almost completely equaled the measured values (characteristic curve 1). The speed of approximation therefore takes place far faster by means of the method according to an embodiment (with which several adjusting force comparison values are changed by several quantization units). Due to this fast adaptation of the reference data, the excess force developed by the drive in the event of jamming is seen to be less than was previously considered normal. Therefore the danger of injury due to the trapping of body parts is less.

In FIG. 3, according to an exemplary embodiment, the relationship between the intensity with which the adjusting force comparison values are adapted and the service life is shown by a characteristic curve. This characteristic curve 10 has the shape of a stepped polygon. The service life or service duration is shown by the number of adjusting operations, i.e. closing operations. The number of closing operations from 0 to 4000 is shown on the abscissa of the diagram in FIG. 3 and the extent of the adaptation is entered on the ordinate in the form of adaptation planes from zero to nine. The level of the stages 6, 7, 8, 9 of the adaptation planes reduces with an increasing number of closing operations. A part interval A, B, C, D is assigned to each stage 6, 7, 8, 9.

The higher the level of the adaptation plane the more intensive the extent or degree of adaptation (the amplitude is changed in the direction of the target curve 1 where there are several adjusting force comparison values). The manner in which numerous adjusting force comparison values are changed, and to what amount, can differ from case to case. In the simplest case, the number corresponds to the adjusting force comparison values to be updated and the amount of change of the respective adaptation plane. This means that in the example in FIG. 3 eight adjusting force comparison values are changed to an amount according to the adaptation level assigned to the stage, immediately after the initial operation (stage 6). The extent of this change is greatest in this stage 6. For this example, this means that the eight adjusting force comparison values are also changed by eight quantization units. It is obvious that the adaptation can also be parameterized differently depending on the application, for example only with a part of the adjusting force reference data whose value is adapted with a different number of quantization units. At the end of the service life (stage 9 in FIG. 3) only one, instead of several, adjusting force comparison values is updated. This means that in this phase of the product service life, in which only slight changes in the friction condition of the mechanical system are expected, the adaptation is correspondingly slow. Events that act only once, such as a unique acting force, have only a slight influence on the stored adjusting force comparison values. Therefore, disturbing influences have only a slight effect.

As can be summarized from the above explanations with reference to FIG. 2 and FIG. 3, the updating of the adjusting force comparison values takes place relative to the service life. This means that conflicting requirements, especially at the start and end of the service life, can be allowed for. The extent of the changes can be seen as a reducing function over the service life, i.e. at the start the updating takes place at a high speed but at a low speed towards the end. The high speed of the adaptation at the start is achieved in that the number of points to be updated and/or the extent of the change is greater. A lower adaptation speed takes effect towards the end of the service life. This is achieved in that only few adjusting force comparison values are changed, in each case by only a small number of quantization units or by only a single quantization unit.

LIST OF REFERENCE CHARACTERS

1 Characteristic curve of the currently determined adjusting force values
2 Starting characteristic curve
3 Characteristic curve of the adjusting force comparison values after the first adjusting operation
4 Characteristic curve of the adjusting force comparison values after the sixth adjusting operation
5 Characteristic curve of the adjusting force characteristic values after the fourteenth adjusting operation
6 First stage
7 Second stage
8 Third stage
9 Fourth stage
10 Adaptation planes as a function of the number of closing operations
11 Arrow
12 Arrow
20 A, B, C, D part intervals

The invention claimed is:

1. A method for limiting the excess force of a closing part of an adjusting device, comprising the steps of:
    determining by an anti-jamming system, during an adjusting operation, current adjusting force values at least within a partial area of the adjusting path in predetermined positions of the closing part, respectively, and
    comparing said values to adjusting force comparative values which are held ready in a storage device, wherein at least one of said stored adjusting force comparative values is adapted to mechanical conditions of the adjusting device and the extent of said adaption is predetermined according to the service life.

2. The method according to claim 1, wherein the extent of the adaptation reduces with the increase in service life.

3. The method according to claim 2, wherein the reduction in the extent of the adaptation takes place in stages over the service life.

4. The method according to claim 3, wherein a part interval of the service life is assigned to each stage, with a number of closing operations being assigned to each of these part intervals.

5. The method according to claim 4, wherein the part intervals have a different width.

6. The method according to claim 5, wherein the number of closing operations assigned to each part interval increases with increasing service life.

7. The method according to claim 6, wherein the extent of the adaptation is greatest in a first part interval immediately following the initial operation.

8. The method according to claim 7, wherein during a first adjusting operation, which is assigned to the first part interval, several adjusting force comparison values are changed during the adaptation.

9. The method according to claim 8, wherein during an adjusting operation, which is assigned to the first part interval, an adjusting force comparison value is changed by several quantization units during the adaptation.

10. The method according to claim 6, wherein during an adjusting operation a number of assigned adjusting force comparison values are changed by several quantization units.

11. The method according to claim 1, wherein during an initial operation adjusting force comparison values, which were not previously determined by an initialization run of this adjusting device, are held ready in the storage device.

12. A system for limiting the excess force of a closing part of an adjusting device, comprising:

an anti-jamming system for determining, during an adjusting operation, current adjusting force values at least within a partial area of the adjusting path in predetermined positions of the closing part, respectively, and means for comparing said values to adjusting force comparative values which are held ready in a storage device, wherein at least one of said stored adjusting force comparative values is adapted to mechanical conditions of the adjusting device and the extent of said adaption is predetermined according to the service life.

13. The system according to claim 12, wherein the extent of the adaptation reduces with the increase in service life.

14. The system according to claim 13, wherein the reduction in the extent of the adaptation takes place in stages over the service life.

15. The system according to claim 14, wherein a part interval of the service life is assigned to each stage, with a number of closing operations being assigned to each of these part intervals.

16. The system according to claim 15, wherein the part intervals have a different width.

17. The system according to claim 16, wherein the number of closing operations assigned to each part interval increases with increasing service life.

18. The system according to claim 17, wherein the extent of the adaptation is greatest in a first part interval immediately following the initial operation.

19. The system according to claim 18, wherein during a first adjusting operation, which is assigned to the first part interval, several adjusting force comparison values are changed during the adaptation.

20. The system according to claim 19, wherein during an adjusting operation, which is assigned to the first part interval, an adjusting force comparison value is changed by several quantization units during the adaptation.

* * * * *